(12) United States Patent
Aggour et al.

(10) Patent No.: US 10,268,345 B2
(45) Date of Patent: Apr. 23, 2019

(54) MEHTOD AND SYSTEM FOR MULTI-MODAL LINEAGE TRACING AND IMPACT ASSESSMENT IN A CONCEPT LINEAGE DATA FLOW NETWORK

(71) Applicant: General Electric Company, Schenectady, NY (US)

(72) Inventors: Kareem Sherif Aggour, Niskayuna, NY (US); Jenny Weisenberg Williams, Niskayuna, NY (US); Justin DeSpenza McHugh, Latham, NY (US); Vijay Shiv Kumar, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 328 days.

(21) Appl. No.: 15/354,678

(22) Filed: Nov. 17, 2016

(65) Prior Publication Data

US 2018/0136798 A1    May 17, 2018

(51) Int. Cl.
*G06F 15/16* (2006.01)
*G06F 3/0482* (2013.01)
(Continued)

(52) U.S. Cl.
CPC ........ *G06F 3/0482* (2013.01); *G06F 3/04847* (2013.01); *G06Q 10/10* (2013.01); *H04L 41/22* (2013.01); *H04L 43/045* (2013.01); *H04L 43/062* (2013.01); *G06F 17/30864* (2013.01); *G06T 11/206* (2013.01); *G06T 2210/21* (2013.01)

(58) Field of Classification Search
None
See application file for complete search history.

(56) References Cited

U.S. PATENT DOCUMENTS 6,874,141 B1 *   3/2005   Swamy .............. G06F 17/2247
                                                         715/206
7,493,570 B2     2/2009   Bobbin et al.
(Continued)

FOREIGN PATENT DOCUMENTS

WO    03/007549 A1    1/2003
WO    2016/014615 A1  1/2016

OTHER PUBLICATIONS

Moreau, Luc et al. "The First Provenance Challenge", Concurrency and Computation: Practice and Experience, Concurrency Computat.: Pract. Exper.,vol. 20, Issue 5, 2000, (pp. 577-586, 10 total pages).
(Continued)

*Primary Examiner* — Phyllis A Book
(74) *Attorney, Agent, or Firm* — Ernest G. Cusick (57) ABSTRACT

According to some embodiments, system and methods for representing nodes and data flows in a network are provided, comprising providing a hierarchical taxonomy for one or more concepts; providing one or more hierarchical taxonomies for one or more boundary types, wherein one or more values from each boundary type are combined to form a definition of a boundary; and associating the at least one concept and at least one boundary with a transmission of data between a first node and a second node, wherein the transmitted data is a data flow. Numerous other aspects are provided.

27 Claims, 8 Drawing Sheets

(51) Int. Cl.
    G06F 3/0484    (2013.01)
    H04L 12/26     (2006.01)
    H04L 12/24     (2006.01)
    G06Q 10/10     (2012.01)
    G06F 17/30     (2006.01)
    G06T 11/20     (2006.01)

(56) References Cited

U.S. PATENT DOCUMENTS

| | | | |
|---|---|---|---|
| 8,983,914 B2 | 3/2015 | Kung et al. | |
| 9,348,879 B2 | 5/2016 | Mohammad et al. | |
| 9,384,231 B2 | 7/2016 | Benjamin et al. | |
| 2003/0191627 A1* | 10/2003 | Au | G06F 17/2785 704/9 |
| 2006/0053382 A1* | 3/2006 | Gardner | G06F 3/0482 715/764 |
| 2006/0182034 A1* | 8/2006 | Klinker | H04L 43/00 370/238 |
| 2007/0112714 A1* | 5/2007 | Fairweather | G06F 8/427 706/46 |
| 2007/0136221 A1* | 6/2007 | Sweeney | G06F 17/30914 706/20 |
| 2009/0228785 A1* | 9/2009 | Creekbaum | G06F 17/212 715/239 |
| 2010/0010968 A1* | 1/2010 | Redlich | G06F 17/30672 707/E17.014 |
| 2012/0023399 A1* | 1/2012 | Hoshino | G06F 17/2735 715/256 |
| 2012/0310875 A1 | 12/2012 | Prahlad et al. | |
| 2013/0127865 A1* | 5/2013 | Nevin, III | G06F 17/30395 345/440 |
| 2015/0143300 A1* | 5/2015 | Zhang | G06F 3/0482 715/845 |
| 2016/0196187 A1 | 7/2016 | Thakur et al. | |
| 2017/0147709 A1* | 5/2017 | Ganz | G06F 3/04845 |

OTHER PUBLICATIONS

Foster, Ian et al., "Chimera: A Virtual Data System for Representing, Querying and Automating Data Derivation", In Proceedings of the 14th International Conference on Scientific and Statistical Database Mgmt (SSDBM), 2002 (pp. 37-46, 10 total pages).

Bose, Rajendra et al., "Composing Lineage Metadata With XML for Custom Satellite-Derived Data Products", Proceedings of the 16th International Conference on Scientific and Statistical Database Management (SSDBM), Jun. 21-23, 2004, (pp. 275-284, 10 total pages).

Sar, Can et al., "Lineage File System", Technical Report, Stanford University, Jan. 2005, 6pgs.

Yu, Jai et al., "A Taxonomy of Scientific Workflow Systems for Grid Computing", ACM SIGMOND Record, vol. 34, Issue 3, 2005, (pp. 44-49, 6 total pages).

Muniswamy-Reddy, Kiran-Kumar et al., "Provenance-Aware Storage Systems", In Proc. Of USENIX Annual Technical Conference, 2006, (pp. 43-56, 14 total pages).

Missier, Paolo et al., "Data Lineage Model for Taverna Workflows With Lightweight Annotation Requirements", In Proc. of 2nd International Provenance and Annotation Workshop (IPAW), 2008 (pp. 17-30, 14 total pages).

Simmhan, Yogesh L. et al., "Karma2: Provenance Management for Data-driven Workflows", International Journal of Web Services Research, vol. 5, Issue 2, 2008, (pp. 1-23, 23 total pages).

Moreau, Luc et al. "The Open Provenance Model: An Overview", Provenance and Annotation of Data and Processes, LNCS 5272, 2008 (pp. 323-326, 4 total pages).

Anand, Manish Kumar et al., "Exploring Scientific Workflow Provenance using Hybrid Queries Over Nested Data and Lineage Graphs", In Proc. of 21st International Conference on Scientific and Statistical Database Mgmt (SSDBM), 2009, (pp. 237-254, 18 total pages).

Spillane, R., et al., "Story Book: An Efficient Extensible Provenance Framework", In Proc. of the 1st USENIX Workshop on Theory and Practice of Provenance, 2009, 10pgs.

The Dodd-Frank Wall Street Reform and Consumer Protection Act, https://www.govtrack.us/congressibills/111/hr4173/text, Jul. 2010, 848pgs.

Missier, Paolo et al., "Janus: From Workflows to Semantic Provenance and Linked Open Data", Provenance and Annotation of Data and Processes, LNCS 6378, 2010, (pp. 129-141, 13 total pages).

Marchant, Hayden et al., "Exploring Data Lineage: Get a Complete Picture of Your Data Flows", IBM Developer Works, Jan. 7, 2010, http://www.ibm.com/developerworks/data/library/techarticle/dm-1001datalineageinfosphereworkbench, 16pgs.

Gehani, Ashish et al., "SPADE: Support for Provenance Auditing in Distributed Environments", In Proc. of 13th ACM/IFIP/USENIX Middleware Conference, 2012, (pp. 101-120, 20 total pages).

McAfee, Andrew et al., "Big Data: The Management Revolution", Harvard Business Review, vol. 90, Issue 10, Oct. 2012 (pp. 60-68, 9 total pages).

Macko, Peter et al., "A General-Purpose Provenance Library", Proc. of the 4th USENIX Workshop on Theory and Practice of Provenance, 2012, https://github.com/pmacko86/core-provenance-library, 6pgs.

Jain, Saurabh et al., "Data Lineage: An Important First Step for Data Governance", Beye NETWORK, retrieved on Oct. 27, 2016, retrieved from http://www.b-eye-network.com/view/17023, Aug. 1, 2013, 3pgs.

Gundecha, Pritam et al., "A Tool for Collecting Provenance Data in Social Media", In proc. of the 19th ACM SIGKDD Intl. Conf. on Knowledge Discovery and Data Mining, 2013, (pp. 1462-1465, 4 total pages).

Ranganath, Suhas et al., "A Tool for Assisting Provenance Search in Social Media", In Proc. of the 22nd ACM Intl. Conf. on Information and Knowledge Management (CIKM), 2013 (pp. 2517-2520, 3 total pages).

Glavic, Boris "Big Data Provenance: Challenges and Implications for Benchmarking", In proc. of the First Workshop on Specifying Big Data Benchmarks, 2014, (pp. 72-80, 9 total pages).

Tomingas, Kalle et al., "Automating Component Dependency Analysis for Enterprise Business Intelligence", In Proc. of International Conference on Information Systems (ICIS), 2014, 15pgs.

Wang, Jianwu et al., "Big Data Provenance: Challenges, State of the Art and Opportunities", Proc. of the IEEE International Conf. on Big Data, 2015, (pp. 2509-2516, 8 total pages).

Franz, Max et al., "Cytoscapejs: a Graph Theory Library for Visualization and Analysis", Bioinformatics, vol. 32, Issue 2, 2016, 2pgs.

"OpenLink Virtuoso Home Page", retrieved on Nov. 17, 2016, retrieved from https://virtuoso.openlinksw.com, 2pgs.

Sparql Query Language for RDF, W3C Recommendation, Jan. 15, 2008, retrieved on Nov. 17, 2016, retrieved from http://www.w3.org/TR/rdf-sparql-query, 72pgs.

Martin Wendt's Homepage, "Tech jquery.dynaturee.js", 2013, retrieved on Nov. 17, 2016, retrieved from http://wwwendt.de/tech/dynatree, 1pg.

Manta Tools—"Manta Flow", retrieved on Oct. 27, 2016, retrieved from https://mantatools.com/manta-flow, 6pgs.

"UeryFlow—Data lineage tool for data warehousing teams", SQLdep, retrieved on Nov. 17, 2016, retrieved from https://sqldep.com, 9pgs.

Solidatus: "Data Lineage and Impact Analysis Simplified", Threadneedle Technology, retrieved on Oct. 27, 2016, retrieved from https://www.threadneedletechnology.com/solidatus, 11pgs.

"WhereScape Red", retrieved on Oct. 27, 2016, retrieved from https://www.wherescape.com/products-services/wherescape-red, 3pgs.

"Cloudera Navigator Lineage Diagrams", retrieved on Oct. 27, 2016, retrieved from https://www.cloudera.com/documentation/enterprise/5-5-x/lopics/cn_iu_lineage.html, 5pgs.

Jean, "How to Track and Visualize Data Lineage",Linkurious SAS, Sep. 24, 2015, retrieved on Oct. 27, 2016, retrieved from https://linkurio.us/how-to-track-and-visualize-data-lineage/, 11pgs.

Abadi, Daniel "Overview of Teradata Loom Technology", TERADATA Data Points, Oct. 7, 2014, retrieved on Oct. 27, 2016, retrieved from (56) References Cited

OTHER PUBLICATIONS http://web.archieve.org/web/20160412092531/http://blogs.teradata.com/data-points/overview-of-teradata-loom-technology/, 4pgs.

Wescott, E.M. et al., "The optical spectrum of aircraft St. Elmo's Fire", Geophysical Research Letters, vol. 23, No. 25, Dec. 15, 1996, (pp. 3687-3690, 4 total pages).

Carn, Simon A. et al., "Tracking volcanic sulfur dioxide clouds for aviation hazard mitigation", Nat Hazards, (2009), vol. 51, DOI:10.1007/s11069-008-9228-4, (pp. 325-343, 19 total pages).

Mather, T. A. et al., "Electrification of volcanic plumes", Surv Geophys, (2009), vol. 27, DOI:10.1007/s10712-006-9007-2, (pp. 387-432, 46 total pages).

International Search Report and Written Opinion issued in connection with corresponding PCT Application No. PCT/US2017/56251 dated Jan. 10, 2018.

\* cited by examiner

MEHTOD AND SYSTEM FOR MULTI-MODAL LINEAGE TRACING AND IMPACT ASSESSMENT IN A CONCEPT LINEAGE DATA FLOW NETWORK

BACKGROUND

Companies and organizations are becoming increasingly data-driven, often processing data from many different sources to enable critical operations. Additionally, many institutions, particularly in the financial fields, are increasingly subject to regulations requiring high levels of accountability for the content and movement of data. For companies maintaining data across a globally interconnected network of thousands of systems, it is becoming increasingly challenging to model the data flowing between those systems.

Therefore, it would be desirable to provide systems and methods to automatically improve the tracing of data flows in a system in a way that provides faster, more effective tracings and that allows for more effective source mining and propagation.

BRIEF DESCRIPTION

According to some embodiments, a method for representing nodes and data flows in a network comprises: providing a hierarchical taxonomy for one or more concepts; providing one or more hierarchical taxonomies for one or more boundary types, wherein one or more values from each boundary type are combined to form a definition of a boundary; and associating the at least one concept and at least one boundary with a transmission of data between a first node and a second node, wherein the transmitted data is a data flow.

According to some embodiments, a system representing nodes and data flows in a network comprises: a plurality of nodes; a lineage module; and a memory in communication with the plurality of nodes and storing program instructions, the lineage module operative with the program instructions and the plurality of nodes to perform the functions as follows: providing a hierarchical taxonomy for one or more concepts; providing one or more hierarchical taxonomies for one or more boundary types, wherein one or more values from each boundary type are combined to form a definition of a boundary; and associating the at least one concept and at least one boundary with a transmission of data between a first node and a second node, wherein the transmitted data is a data flow.

According to some embodiments, a non-transitory, computer-readable medium stores instructions that, when executed by a computer processor, cause the computer processor to perform a method for representing nodes and data flows in a network, the method comprising: providing a hierarchical taxonomy for one or more concepts; providing one or more hierarchical taxonomies for one or more boundary types, wherein one or more values from each boundary type are combined to form a definition of a boundary; and associating the at least one concept and at least one boundary with a transmission of data between a first node and a second node, wherein the transmitted data is a data flow.

A technical effect of some embodiments of the invention is an improved and/or computerized technique and system for capturing information about different types of nodes (e.g., data systems, models/analytics, processes, reports, etc.) and the data flowing between them, and provide answers to questions about the lineage of various datasets. In one or more embodiments, the data system may be a database, a data warehouse, or any other suitable data system. This information may then be made available for interactive exploration in the form of a directed graph (network) where nodes may represent data producers and consumers (e.g., systems, models/analytics, processes, reports, etc.) and edges may represent contextualized data flows. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DETAILED DESCRIPTION

Companies and organizations are becoming increasingly data-driven, often processing data from many different sources to enable critical operations. Additionally, many institutions, particularly in the financial fields, are increasingly subject to regulations requiring high levels of accountability for the content and movement of data. For companies maintaining data across a globally interconnected network of thousands of systems, it is becoming increasingly challenging to track the data flowing between those systems.

To address this need, one or more embodiments may provide an interactive data lineage tool ("tool") allowing organizational data flows to be modeled and visually explored, enabling the user to discover all systems where data is found that meets certain criteria. The tool may allow data flows to be contextualized in a multi-modal manner, using business-specific metadata such as the concept, business, and product to describe the data flowing from one node to another. The tool may provide the capability to trace the origination and destination systems of particular datasets in this multi-modal context, as well as to validate that the data flow network is sound.

In one or more embodiments, a method and system is described that may capture information about different types of nodes (systems, models/analytics, processes, reports, etc.) and the data flowing between them, and provide answers to questions about the lineage of various datasets. This information may then be made available for interactive exploration in the form of a directed graph (network) where nodes represent data producers and consumers (e.g., systems, models/analytics, processes, reports, etc.) and edges represent contextualized data flows between them.

In one or more embodiments, the tool may enable users to characterize data flows between nodes in a multi-modal manner using an extensible set of hierarchical taxonomies. One non-exhaustive representative example of a set of taxonomies may include hierarchies for businesses, products and concepts associated with a given set of data. Other suitable taxonomies may be used. For example, in a large financial organization, the businesses taxonomy may contain the various levels of businesses and sub-businesses within the corporate hierarchy. The products taxonomy may indicate the relevant product or sub-product lines that the business sells, services, leases and/or loans. The hierarchical concepts taxonomy may indicate what the data contains (e.g., customer contact information, customer financial statements). In this way, the data flows may be contextualized or characterized across an arbitrary number of dimensions or 'modes' using organization-specific hierarchies.

Embodiments may facilitate the mining of the network, including the ability to view the entire network, view only those nodes upstream and/or downstream of a subset of nodes, or view the network filtered by terms selected from the data flow taxonomies.

Additionally, in embodiments, the tool may enable users to discover how data propagates through the network, including tracing the lineage of data upstream from a node to its origin node(s) or downstream to its destination(s). This tracing may be performed taking into account the multi-modal characterization of the data.

In one or more embodiments, the tool may enable the validation of the network to ensure that no node is sending out information that it neither creates nor receives from another node. This validation procedure may be performed taking into account the multi-modal characterization of the data.

Embodiments may provide significant technical improvements to facilitate both upstream and downstream lineage tracing of multi-modal information. The present invention is directed to more than merely a computer implementation of a routine or conventional activity previously known in the industry, as it significantly advances the technical efficiency of tracing information between nodes by implementing a specific new method and system as defined herein. The present invention is a specific advancement in the area of information tracing by providing benefits in data accuracy and data availability, and such advances are not merely a longstanding commercial practice. The present invention provides improvement beyond a mere generic computer implementation as it involves the processing and conversion of significant amounts of data in a new beneficial manner as well as the interaction of a variety of specialized client and/or third party systems, networks and subsystems. For example, in one or more embodiments, a lineage module may process and analyze information to provide extremely valuable features to understand how data travels in the network including tracing the lineage of data upstream from a system to its origin system(s) or downstream to its destination(s) for impact assessment, thus improving the overall performance of a system. Users may also validate the network to ensure that no node is sending out information that it neither creates nor receives from another node. Embodiments enable administrators to create and edit the network.

Embodiments provide for the: display of an entire network of nodes; starting from a particular node, view of the nodes feeding data to and/or consuming data from that particular node; creation/modification/deletion of data flows using an appropriate concept-boundary taxonomy; filter of the network views using those taxonomies (e.g., only show data flows containing at least one of a particular concept, business boundary and/or product boundary); validation of the network to assess if the representation is logical; and starting from a specific node, trace of the data in that node to discover its origination or destination points.

An enterprise may be tasked with responding to requests by accessing various data sources or data systems to enable critical business operations. For example, the enterprise may need to respond to a request by accessing a globally interconnected network of thousands of data systems. Conventionally, the different systems in a network operate in silos, independently managing the data relevant to their specific functions. Due to the disjoint nature of this approach, it may be difficult to get a complete picture of where all of the data within the enterprise resides, or how it flows from system to system within the enterprise overall. This may severely impede the ability to perform key data management activities, for example, to identify duplicate data or processes, or find the point of origination of a particular data element. As a result, with conventional systems it may be difficult and time consuming to trace the origination of a data element and discover the data elements that meet certain criteria.

Embodiments provide for the characterization of data (e.g., metadata, fields) flowing from one node to another, and the ability to analyze the flow. Embodiments provide for the tracing of a lifecycle (e.g., forward/downstream and backward/upstream) of a data element. Embodiments trace the lineage of data across generic heterogeneous data systems. As used herein, "upstream" nodes may be one or more nodes that feed/send relevant data element(s) to the selected node; and "downstream" nodes may be one or more nodes that consume/receive relevant data element(s) from the selected system.

In embodiments, the data element may be characterized by one or more concepts and one or more boundaries (e.g., a business boundary and a product boundary in one embodiment), describing the data element in the context of hierarchical taxonomies relevant to the specific enterprise. In one or more embodiments, the concepts, businesses and products may be organized as groupings of sub-concepts, sub-businesses, and sub-products. These may be nested using an arbitrary number of levels, forming hierarchical taxonomies. In one or more embodiments, the depth of the hierarchy is not fixed, providing flexibility and the ability to trace data elements based on parent (above) and child (below) layers for a given data element's characterization.

As used herein, "concept" may refer to a logical grouping of multiple data elements, and the type of data or data contents (e.g., the concept may be "Party Identity" for data elements containing customer names, phone numbers and addresses); and "concept treatment" may refer to the action performed on the data by the receiving system (e.g., create, read, modify and augment). In some embodiments, a concept may include a handful of data elements, while others may represent 20 or more data elements. In some conventional systems, lineage of a data element may be reported at the granularity of an attribute (e.g., company name or company zip code), resulting in significant overhead and repetition for data elements that are always processed in groups. Embodiments may trace the lineage of the data element at the granularity of the concept, with metadata describing data flows in the context of concepts and boundaries of interest, where the concept level may be broader than the attribute level. As groups of data elements (e.g.

name, address city, state, zip code) may often be kept together, defining a data flow in terms of a concept may expedite lineage tracing. Additionally, by having concepts, and tracing data elements at the concept level, the problems (e.g., using an incorrect data element) associated with data elements having different meanings in different contexts may be avoided. The inventors note that the use of concepts may be beneficial from a scalability perspective, as it may reduce the volume of metadata flow that must be managed.

As used herein, the term "edge" may represent a directed data flow between two nodes. As used herein "business boundary" may refer to the business or sub-business for which the data element exists; and "product boundary" may refer to the product line for which the data element exists. Other suitable boundary types may be defined and associated with data sets. As used herein, "business" and "business boundary" may be used interchangeably. As used herein, "product" and "product boundary" may be used interchangeably.

Embodiments may fully characterize data flows using an extensible set of hierarchical taxonomies, including many potential combinations of businesses, products and concepts associated with data elements flowing from one node (source) to another node (destination). Embodiments provide for a data flow to be associated with one or more boundary groups, which in turn may contain one or more concepts and treatments and boundary sets (e.g., combination of boundaries). Each boundary set may be a combination of boundaries (e.g., business, product and/or any other suitable boundary). Embodiments support an arbitrary number of boundary types, such that additional boundary types may be added solely via additions to the instance data with no data model or code changes required. Embodiments facilitate the mining of the network, including the ability to view the entire network, view only those nodes upstream and/or downstream of a subset of nodes, or view the network filtered by terms selected from the data flow taxonomies.

The hierarchical nature of the concept and boundary taxonomies may allow, in one or more embodiments, for inheritance (e.g., the selection of the parent may imply the selection of the children). For example, if a data flow includes a Concept C, then it may be assumed to include sub-concepts $C_a$, $C_b$, and $C_c$.

Embodiments provide for the flow of data elements based on different levels of the hierarchy. For example, if a query is to trace all data flows in the United States, the lineage module may include a data flow from New York City to Chicago without a specific, explicit instruction to include New York City to Chicago. This may be unlike conventional systems that may not know that New York City to Chicago is part of a data flow in the United States and therefore requires a specific instruction to include a data flow from New York City to Chicago.

In embodiments, in tracing a given node's data to their sources, a lineage module may evaluate each node that is directly upstream of the target node and determine whether the data element concept, business and product combinations flowing from the upstream node to the given node match the contextualized data received by the target node, within the constraints of any optional user-defined filters applied. If they match, the upstream node may be included in the trace. Then the next node(s) upstream of the included upstream node may be evaluated. The evaluation cycle may continue until an origin of the data elements is determined or until another user-defined stopping point is met (e.g., stopping a branch of the trace upon reaching a specific data warehouse node, in one embodiment). If any of the data element concept, business and product combinations flowing from the upstream node to the given node do not match the concept, business and product boundaries of interest, the upstream node may not be included in the trace results. Each evaluation may be dependent on the results from the previous evaluation, such that the only data flows that may be included are those that send relevant concept, business and product combinations that fall within their hierarchy of the data elements received by the target node.

Similarly, in embodiments the lineage module may trace the given node downstream by evaluating each node directly downstream of the given system, and determining whether the data element concept, business and product combinations flowing from the given node downstream towards a destination node match the boundaries of interest. If they match, the downstream node may be included in the trace. Then the next node(s) downstream of the included downstream node may be evaluated. The evaluation cycle may continue until a final destination of the data elements from the target node is determined or until another user-defined stop point is met. If any of the data element concept, business and product combinations flowing from the given node to the downstream node(s) do not match the boundaries of interest, the downstream node may not be included in the trace results. As described above, each evaluation may be dependent on the results from the previous evaluation.

Figure 1:
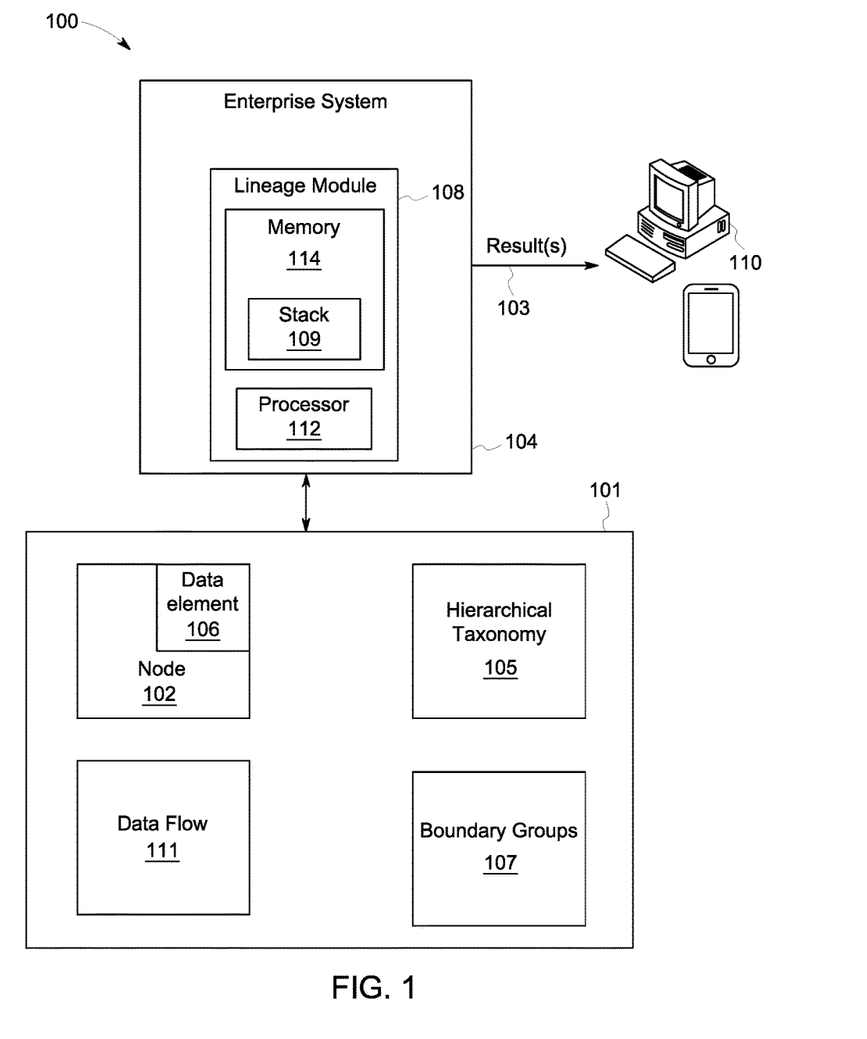
FIG. 1 illustrates a system according to some embodiments.

FIG. 1 is a high-level architecture of a system 100 in accordance with some embodiments. In one or more embodiments, the system 100 may include an interconnected network of one or more other systems or nodes 102 stored in a semantic data store 101. In some embodiments, the nodes 102 may be at least one of a database or data warehouse, an external source, an application a model/analytic, a report or a process. Each node 102 may include one or more data elements 106. In one embodiment, a semantic triple store 101 may store the node 102, data flow 111, taxonomy 105 and boundary group data 107. Semantic data stores may include intrinsic recursive graph query capabilities, which may enable the efficient network traversal functionality used by the tracings and other operations. Additionally, semantic data stores may enable a high level of expressivity for representing the hierarchical taxonomies and data flow metadata in an easily extensible format. In some embodiments, the semantic data store 101 may be used to store the data model and instance data as subject-predicate-object tuples. Finally, semantic models may increase the likelihood of inferring additional knowledge about the lineage networks through automated reasoning capabilities.

The enterprise system 104 may, according to some embodiments, utilize a lineage module software and processing platform 108 ("lineage module") and the information in the semantic data store 101 to automatically create a trace for a given node 102 in response to a user query, and may transmit the trace to various user platforms 110 as appropriate (e.g., for display to a user). As used herein, the term "automatically" may refer to, for example, actions that may be performed with little or no human intervention.

The lineage module 108 may include one or more processing elements 112 and a memory 114. The processor 112 may, for example, be a conventional microprocessor, and may operate to control the overall functioning of the lineage module 108. In one or more embodiments, the lineage module 108 may include a communication controller for allowing the processor 112, and hence the lineage module 108, to engage in communication over data networks with other devices (e.g., the user platform 110). In one or more embodiments, the lineage module 108 may include one or more memory and/or data storage devices 114, which may comprise any combination of one or more of a hard disk drive, RAM (random access memory), ROM (read only memory), flash memory, etc. The memory/data storage devices 114 may store software that programs the processor 112 and the lineage module 108 to perform functionality as described herein.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

A user may access the system 100 via one of the user platforms 110 (e.g., a personal computer, tablet or smartphone) to view information and/or manage a tracing in accordance with any of the embodiments described herein. According to some embodiments, an interactive graphical display interface may let an operator define and/or adjust certain parameters and/or provide or receive automatically generated results 103. For example, the user may choose to view the entire network of nodes and data flows, or may select one or more nodes and choose to display all nodes that feed the selected node and/or consume from the selected node. A user may select an individual node in the network and may expand the graph to include nodes upstream and/or downstream of the selected node. In embodiments, the user may choose to display the concepts and/or boundaries along the edge or data flow. As used herein, the terms "edge," "path" and "data flow" may be used interchangeably. The user may also apply concept or boundary filters. In some embodiments, if a user selects more than one entry within a group (e.g., concepts) to apply a filter, the system 100 may treat those selections with an OR operand. If the user makes multiple filter selections across different groups (e.g., business and product filter), the system 100 may treat those selections with an AND operand. For example, a filter may look like "(concept1 OR concept2) AND business1." In one or more embodiments, filtering may be applied using one of an "any" mode and an "exact" mode. Filtering using "any" mode may display edges that contain exact matches, supersets and subsets of the filter, whereas filtering using "exact" mode may only display exact matches and supersets of the filter.

Further in some embodiments, users, such as administrators, may add, modify, and remove nodes, manage boundary groups by selecting entries from the hierarchical taxonomies, for example, and link systems with boundary groups to create data flows.

Figure 2:
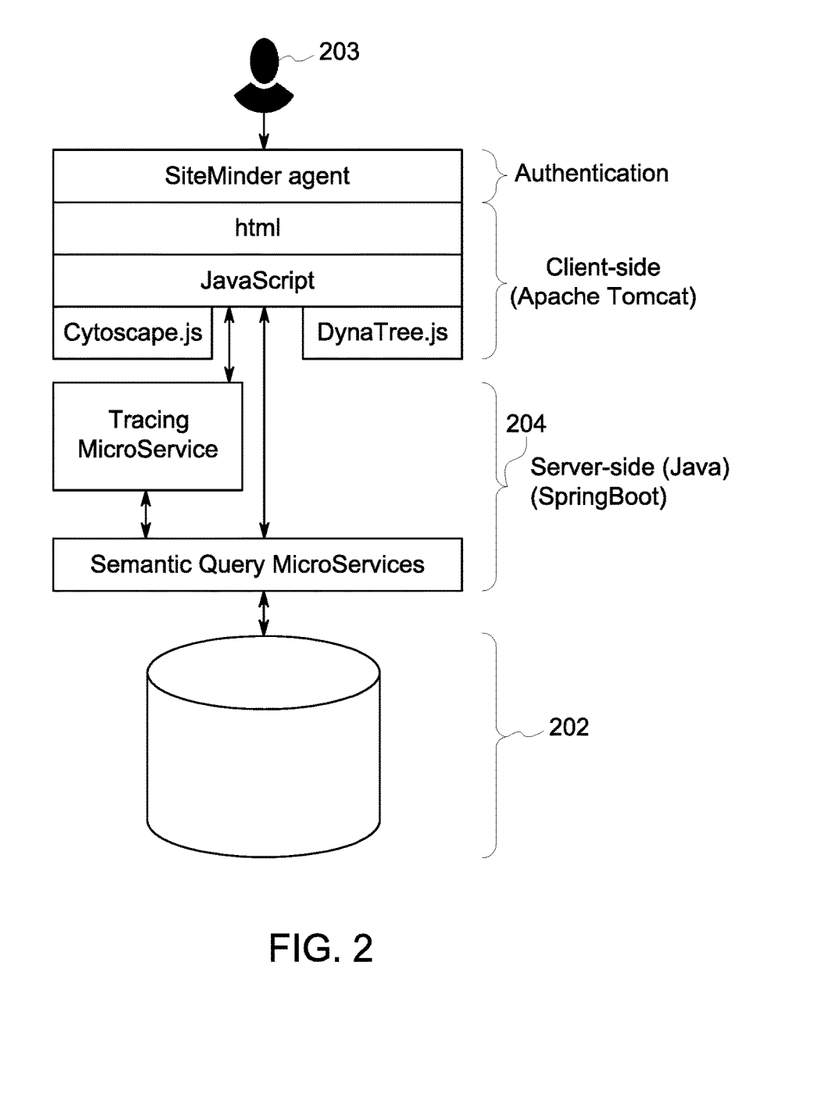
FIG. 2 illustrates a system architecture according to some embodiments.

Turning to FIG. 2, a high-level conceptual architecture of the enterprise system 104 in accordance with some embodiments is provided. In some embodiments, a data storage layer 202 may be comprised of a semantic triple store. Other suitable data storage layers may be used. In some embodiments, an HTML and JavaScript web-based user interface may allow users to create, manage, view and capture information about nodes and the data flowing between them, and then interactively explore this information to answer critical questions. Embodiments may allow a user 203 to: 1) Display the entire network of nodes; 2) Starting from a particular node, view the nodes feeding data to and/or consuming data from that particular node; 3) Create/modify/delete data flows using the appropriate concept-boundary taxonomies; 4) Filter the network views using those taxonomies (e.g., only show data flows containing Party Identity); 5) Validate the network to assess if the representation is logical; and 6) Starting from a specific node, trace the data in that node to discover its origination or destination points.

In some embodiments, the user 203 may edit the network and perform tasks such as adding nodes and defining the flows between them, and generating text-based reports of the data flows.

In some embodiments, a set of Java micro-services (e.g., Tracing MicroService and Semantic Query MicroServices) 204 may enable functionality such as network tracing and querying and updating the data store. Other suitable services may be used to enable functionality.

The inventors note that while a semantic data store is described herein, a traditional relational, NoSQL store, or other suitable data store may be used. However, the semantic data store may include intrinsic recursive graph query capabilities, which may enable the efficient network traversal functionality used by the tracings and other operations. Additionally, the semantic data store may enable a high level of expressivity for representing the hierarchical taxonomies and data flow metadata in an easily extensible format. In some embodiments, the semantic data store may be used to store the data model and instance data as tuples (e.g., concept, business boundary, product boundary). The inventors further note that the use of semantic models may increase the likelihood of inferring additional knowledge about the lineage networks through automated reasoning capabilities.

Turning to FIGS. 3-7 and 9, flow diagrams of examples of operation and user interfaces according to some embodiments are provided. In particular, FIGS. 3, 6 and 9 each provide a flow diagram of a process 300, 600 and 900, showing the trace process, the validation process, and the network representation process respectively, according to some embodiments. Processes 300/600/900 and other processes described herein may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 100 is conditioned to perform the processes 300/600/900 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow charts described herein do not imply a fixed order to the steps, and embodiments of the present invention may be practiced in any order that is practicable.

Figure 9:
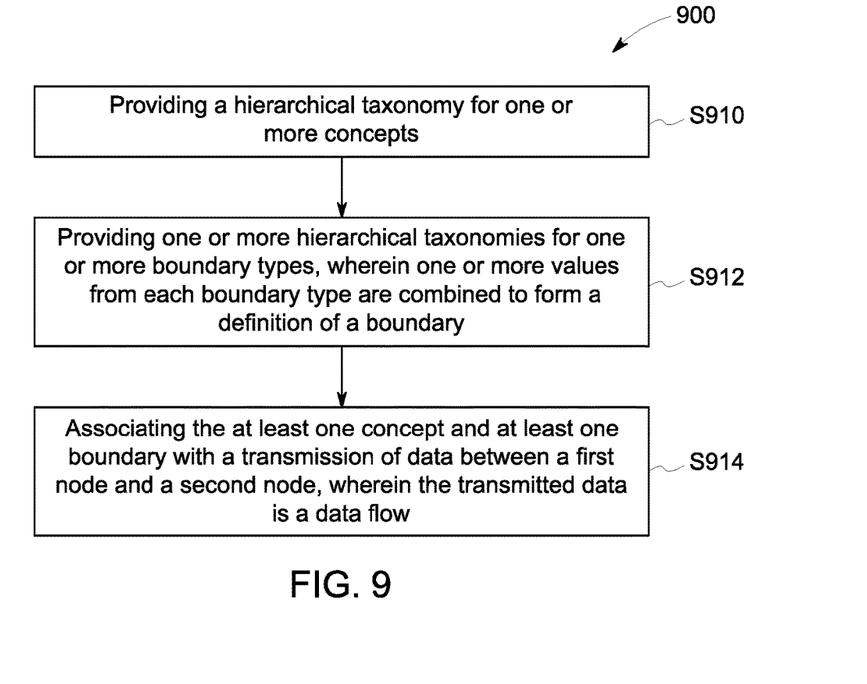
FIG. 9 illustrates a flow diagram according to some embodiments.

FIG. 9 describes a process for representing nodes and data flows in a network according to some embodiments. Initially, at S910, a hierarchical taxonomy 105 is provided for one or more concepts. Then in S912, one or more hierarchical taxonomies 105 for one or more boundary types are provided. In some embodiments, one or more values from each boundary type may be combined to form a definition of a boundary. In one or more embodiments, the boundary type may be at least one of a business boundary and a product boundary. Other suitable boundary types may be used. In one or more embodiments, a depth of the hierarchy is unfixed.

Figure 4:
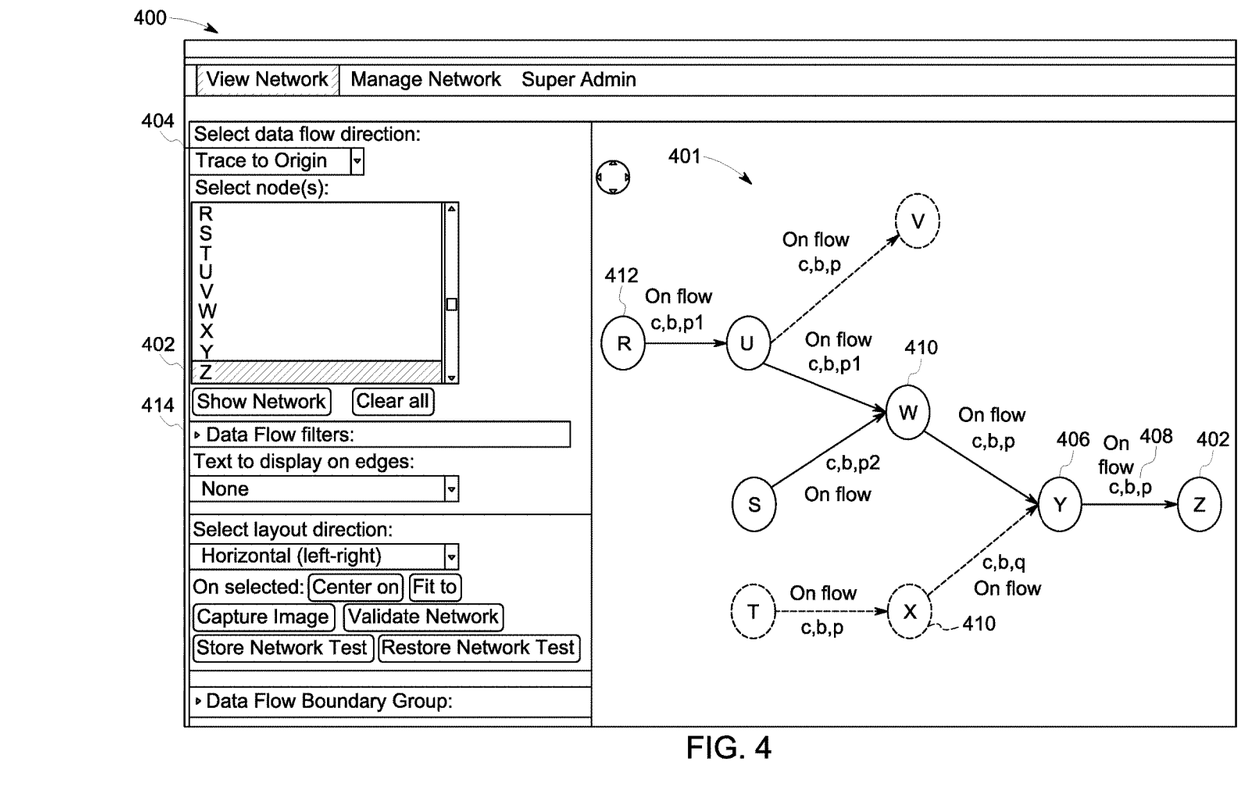
FIG. 4 illustrates a user interface according to some embodiments.

Then in S914, the at least one concept and at least one boundary 408 are combined into a boundary group 107 and associated with a transmission (e.g., on flow in FIG. 4) of data between a first node (e.g., Y in FIG. 4) and a second node (e.g., Z in FIG. 4). In one or more embodiments, the transmitted data is a data flow 111. In one or more embodiments, the network may be displayed on a graphical user interface 400 (FIG. 4), where the display includes the concepts and boundaries associated with the data flow 408. In some embodiments, a user may select one or more values from the hierarchical taxonomies to filter 414 the displayed network and limit a then-generated display to a network that meets the filter criteria.

Figure 3:
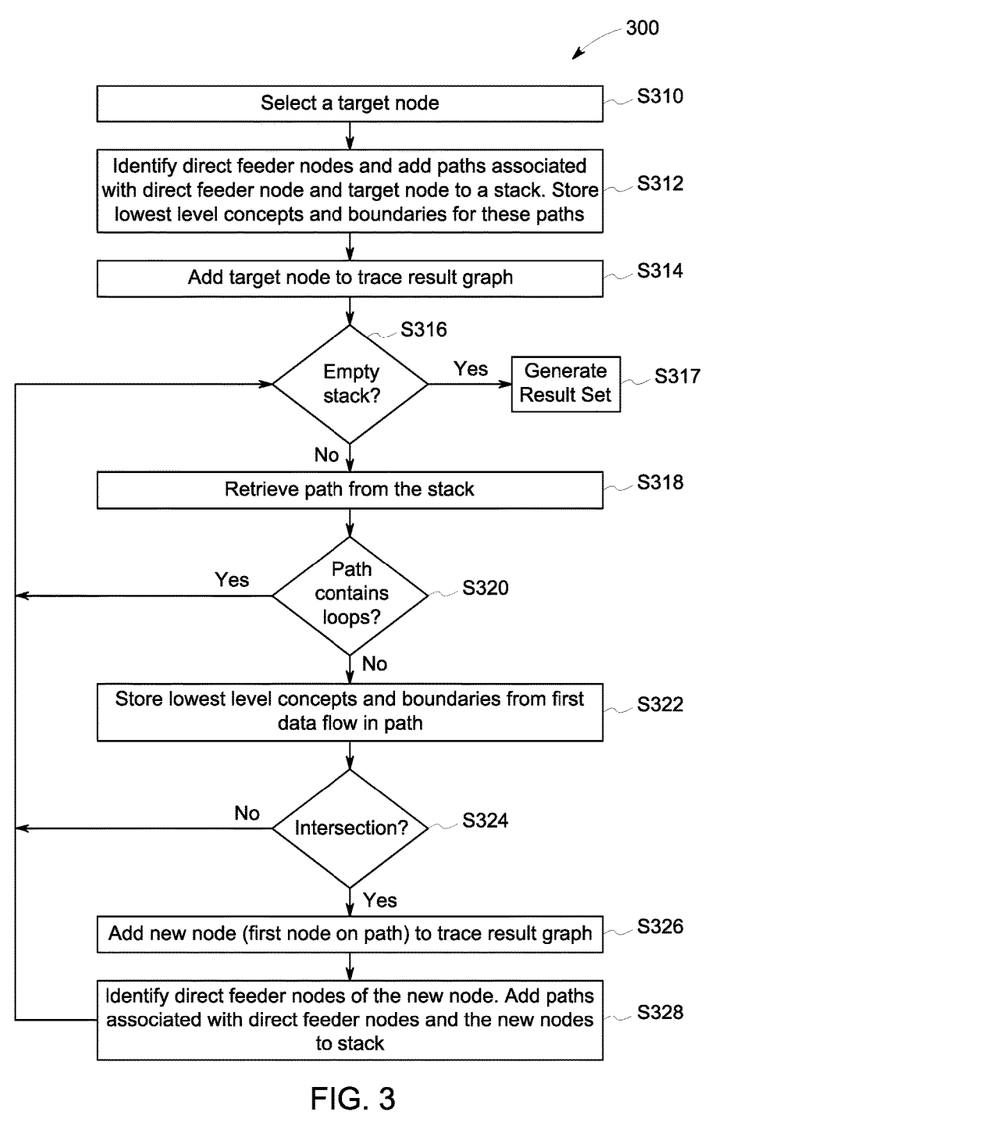
FIG. 3 illustrates a flow diagram according to some embodiments.

FIG. 3 describes the trace process according to some embodiments. Initially, at S310, a target node 402 (e.g., Z in FIG. 4) is selected. In some embodiments, the target node 402 may be selected via a graphical user interface 400. The user 203 may select the data flow direction for the trace via a drop-down menu 404, or any other suitable selector (e.g., radio button, free-form data field, etc.). In the example shown in FIG. 4, the selected data flow direction 404 is that of an origin trace, and therefore the trace will be upstream. Alternatively, if the data flow direction is that of a destination trace, then the trace will be downstream. The text that follows describes an upstream trace.

Then in S312 the nodes which directly feed ("direct feeder nodes") 406 the target node 402 are identified and paths associated with the direct feeder node 406 and the target node 402 are added to the stack 109. In one or more embodiments, identifying the direct feeder nodes 406 may include identifying the concepts-boundary combinations that flow from these direct feeder nodes 406 to the target node 402, and converting the concepts-boundary combinations to the lowest level concepts and boundary combinations from the hierarchical taxonomy. In one or more embodiments the lowest level concepts and boundaries for these paths may be stored. In one or more embodiments, direct feeder node identification may include capturing the paths from each direct feeder node 406 to the target node 402 and adding the path to a stack data structure 109 (FIG. 1) stored in the memory 114. While a stack data structure may be used in one embodiment, in other embodiments other data structures may be used (e.g., a list). In FIG. 4, node Y is identified as a direct feeder node 406 as node Y directly feeds the target node Z 402. The concepts/boundaries (c,b,p) 408 may be identified as the concepts/boundaries flowing into the target node Z 402, and these may be converted to lowest-level concepts/boundaries such as (c,b,p1) and (c,b, p2), assuming that product p has subsets p1 and p2. Path Y->Z will be added to the stack, because Y directly feeds the target node Z.

Then in S314 the target node 402 is added to a trace result graph 401 In one or more embodiments, the trace result graph 401 is a graph showing the target node 402 and the nodes upstream of the target node through which data flows to the target node 402. Additional nodes may be added to the trace result graph 401 as the process executes further. Turning back to the example in FIG. 4, target node Z 402 is added to the traced result graph 401 in S314.

A determination is then made in S316 whether the stack 109 of paths to be traced is empty or not. In one or more embodiments, when a new path is added to the stack, the path is added to the top of the stack. In one or more embodiments, when a next path to be traced is taken from the stack, the path is taken from the top of the stack. In one or more embodiments S316 may be the start of a subroutine that is called iteratively. In one or more embodiments, if at any point it is determined in S316 that the stack is empty, the process proceeds to S317 and result set may be generated. In one or more embodiments, the result set may contain the trace result nodes, edges, and concepts/boundaries path on each edge relevant to the trace, and may be transmitted to various user platforms 110 as appropriate (e.g., for visual display of the network to a user, or to populate a trace report result document). In one or more embodiments, an empty stack 109 may indicate that all nodes relevant for the trace result graph 401 have been identified, and the trace process 300 is complete.

If it is determined in S316 that the stack 109 is not empty, the process proceeds to S318, and a path is retrieved from the stack 109. Turning back to the example in FIG. 4, the first path retrieved from the stack 109 is Y→Z. A future path retrieved from the stack 109 may be U→W→Y→Z.

Then for a retrieved path, it is determined if any loops exist in S320. In one or more embodiments, a loop may be represented as redundant segments of the path. For example, a path B→N→B contains a loop. If it is determined in S320 that the path contains a loop, then no further action is taken for that path, and the process returns to S316 to determine if any other paths remain in the stack.

If it is determined in S320 that a path does not contain a loop, the process 300 proceeds to S322, and one or more concepts and boundaries found on the first data flow on the path may be identified and converted to the lowest level concepts and boundaries, and the lowest level concepts and boundaries from the first data flow are stored in the path. Turning back to the example in FIG. 4, for the path U→W→Y→Z, S322 involves identifying the lowest level concepts/boundaries for the first data flow on the path U→W, which is (c,b,p1) in FIG. 4.

Then in S324, the lowest level concepts/boundaries for the first data flow are compared to the lowest level concepts/boundaries for the remainder of the path and it is determined whether an intersection exists. In some embodiments, when determining whether the intersection exists, it may be for the existence of an intersection of the lowest level concepts/boundaries in the first data flow with the rest of the path. Continuing with the example in FIG. 4, and the path U→W→Y→Z, in S324 the lowest level concepts/boundaries for U→W is compared to the lowest level concepts/boundaries for W→Y→Z. If it is determined in S324 that there is no intersection between the two results, no further action is taken for that path and the process returns to S316 to determine if any other paths remain in the stack. If it is determined in S324 that there is an intersection between these two results (e.g. some subset of lowest-level concepts/boundaries appear in both lists), then the node at the start of the path (e.g. U) is determined to be relevant to the trace, because it is providing data that flows through successive nodes to eventually arrive at the target node, and the new node (first node on the path) (e.g. U) is added to the trace result graph 401 in S326. Then in S328, the direct feeder nodes of the new node (e.g., U) just added to the trace result graph 401 are identified and paths associated with the direct feeder nodes and the new nodes are added to the stack of paths (e.g. R→U→W→Y→Z) for evaluation. The process 300 then returns to S316.

In one or more embodiments, the evaluation (in S324) of each edge/data flow may be expressed by the set equation:

$$S_{A1 \rightarrow A2} \cap S_{A2 \rightarrow T} \neq \emptyset \rightarrow \text{keep} \qquad (1)$$

where:

$$S_{A2 \to T} = S_{A2 \to A3} \cap S_{A3 \to A4} \cap \ldots \cap S_{An \to T} \quad (2)$$

and $S_{Ax \to Ay}$=set of tuples sent from node Ax to node Ay.

The inventors note that in FIG. 4, as part of process 300, Nodes U and S may be added to the trace result graph 401 despite neither (c,b,p1) nor (c,b,p2) exactly matching (c,b,p). This is because when (c,b,p) is converted to the lowest level concepts/boundaries, the result is (c,b,p1) and (c,b,p2) and therefore intersects with both data flows U→W and S→W. This demonstrates the situation in which upstream systems may send combinations of p1 and p2 which are then merged together to form the complete data for product p. As such, any trace may also identify and include any data flows with subsets of the given concepts and boundaries of interest. Likewise, a node may send a superset of the product of interest, which may need to be included in the trace result graph as well. For example, for a target concept a1, "a" may be a superset of a1, as the target node receives "a" and passes a1. The inventors further note that the dotted nodes and data flows in FIG. 4 are not included in the trace result graph. Node X may not be included because in Step S324 it is determined that (c,b,q) does not have an intersection with (c,b,p1) and (c,b,p2). Further, Node V may not be included in the trace result graph 401 because it is not upstream from node U and thus not directly upstream of target node Z, and thus may not be added to the stack in Step 312.

In some embodiments, the user 203 may choose to apply a filter 414 to the tracing process, which may limit the trace results to data flows that meet the filter criteria (e.g., tracing restricted to certain concepts or businesses or products (or sub-concepts or sub-businesses or sub-products), in specific embodiments).

Figure 5:
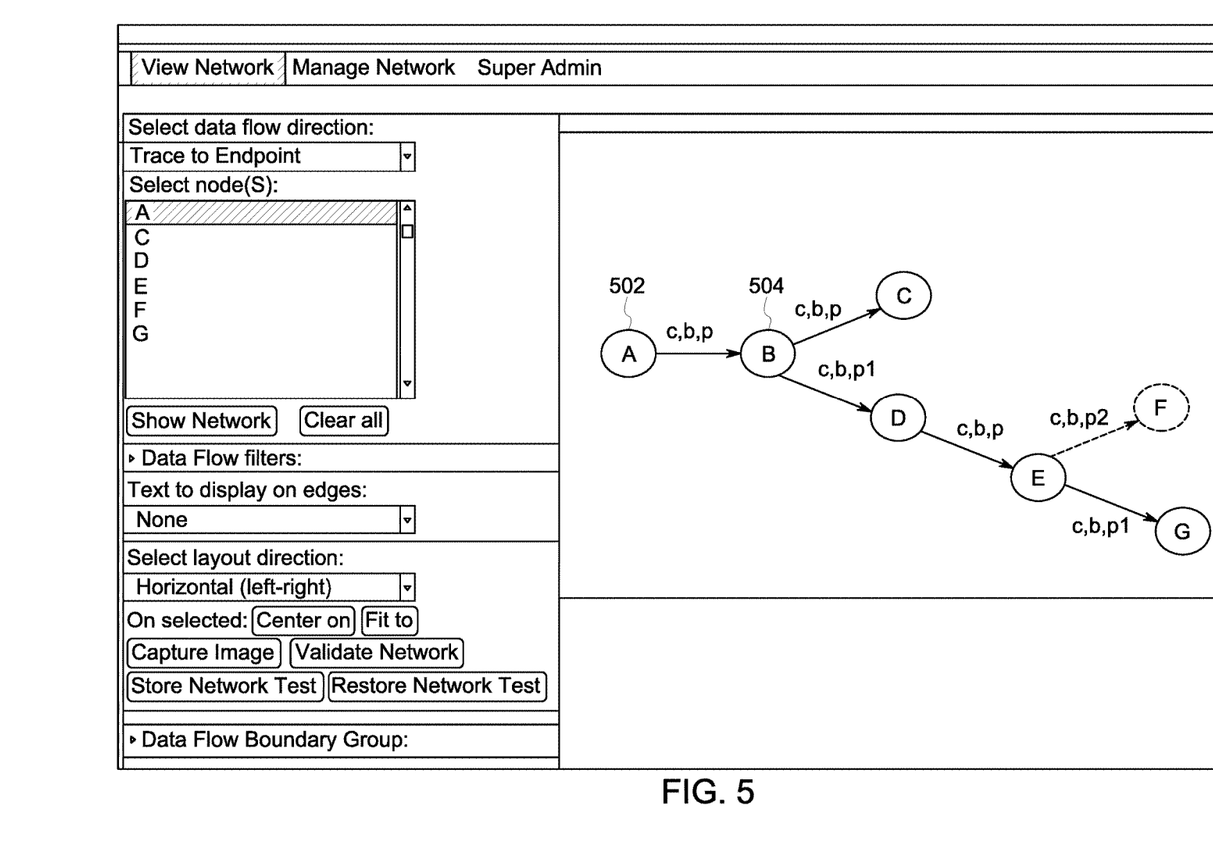
FIG. 5 illustrates a user interface according to some embodiments.

In one or more embodiments the process 300 may also be used to trace downstream to determine one or more destinations of a target node, in a manner analogous to the upstream algorithm described above. In some embodiments, a user may want to retire a system and to see all downstream systems that may be impacted. Therefore, the user may execute a downstream trace, for example, starting from node A (502 in FIG. 5). For example, the starting or target node 502 is selected in S310. Then, a direct feeder node is identified in S310. When the trace is downstream, "direct feeder node" may refer to the node that directly receives data from (e.g., is directly fed by) the target node 502. In FIG. 5, the direct feeder node 504 is B. And the process 300 continues as above. The inventors note that in FIG. 5, because edge B→D only sends c, b p1, anything downstream of node D must be a subset of (c, b, p1) to show up in the trace results. Therefore, even though edge D→E sends concept/boundaries (c, b, p), edge E→F will not show up in the trace starting from node A because it is not a subset of (c, b, p1). This demonstrates a benefit of taking the intersection of the concept/boundaries, namely, preventing the accidental return of an edge with data that does not directly originate from the starting node (node A, in this example).

Figure 6:
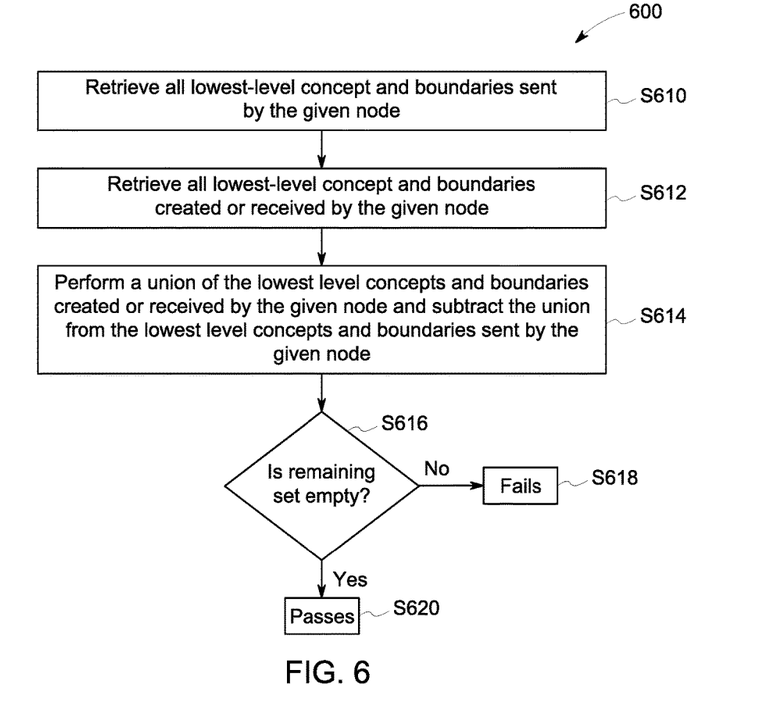
FIG. 6 illustrates a flow diagram according to some embodiments.

FIG. 6 provides a flow diagram of a process 600 for performing validation on nodes in the graph according to one or more embodiments. In some embodiments, the validation process 600 may be applied per-node, determining whether the data that a given node sends is possible given the data that the node creates or receives. In some embodiments, a node will fail the validation process if it is found to be sending out data that it is neither creating nor receiving. In one or more embodiments, the validation process 600 may include identifying the input and output concepts/boundaries for a given node, and checking if each output is contained within the input set. In some embodiments, the validation may be performed on a single node, or on all of the nodes displayed in the network.

Initially at S610, for each node N (target node) to validate, all lowest-level concept/boundaries of interest (e.g., business and product combinations) sent by a given node (e.g., direct feeder node) to the target node may be retrieved. In one or more embodiments, one or more nodes to which the target node directly sends one or more data elements is identified. Then at S612, all lowest-level concept/boundaries of interest (e.g., grouping) created or received by node N are retrieved. In one or more embodiments, each grouping created by the target node may then be retrieved. In some embodiments, each grouping sent by the target node directly to one or more other nodes may be retrieved. Then, at S614, a union of the lowest level concepts and boundaries created by the target node and received by the target node is performed, and the union is subtracted from the lowest level concepts and boundaries sent by the target node N. At S616, it is determined if any concept/boundaries of interest remain in the set after the subtraction is performed in S614. If the set is not empty at S616, the node N fails the validation at S618. If the set is empty at S616, the node N passes the validation at S620.

In one or more embodiments, the validation may be expressed by the set equation:

$$S_S - (S_C \cup S_R) \neq \emptyset \to \text{fails}$$

Where $S_s$=set of concept/boundaries sent, $S_c$=set of concept/boundaries created, and $S_R$=set of concept/boundaries received by Node N.

In one or more embodiments, if a system fails validation, the failure may be due to a wrong or incomplete network representation (e.g., a downstream data flow has been added without a corresponding upstream data flow), as opposed to a problem in the underlying system. In some embodiments, the validation routine may be extended to identify redundancies in data creation, transmission, or storage (for data deduplication) across the nodes.

Figure 7:
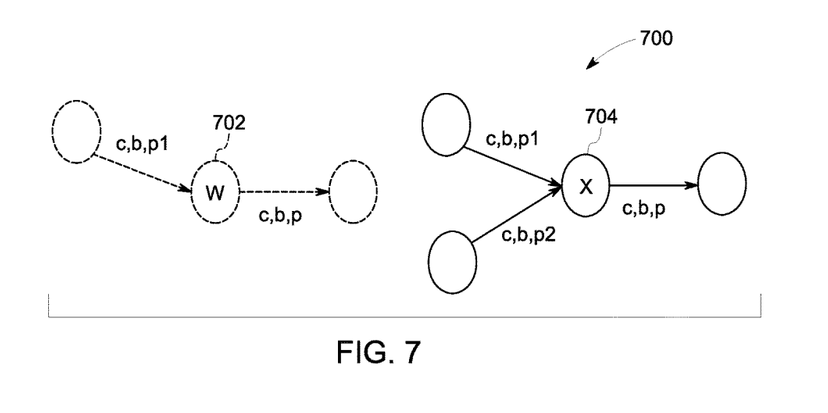
FIG. 7 illustrates a lineage graph according to some embodiments.

Turning to FIG. 7, a lineage graph 700 of an example of the validation process described in FIG. 6 is provided, in accordance with some embodiments. The example in FIG. 7 includes concept and boundary hierarchies, and assumes that product p is comprised of sub-products p1 and p2. Node W 702 may fail validation, because it only receives sub-product p1, which is not enough for it to send product p. On the other hand, Node X 704 may pass validation because it receives sub-products p1 and p2, which may be sufficient to send product p.

Figure 8:
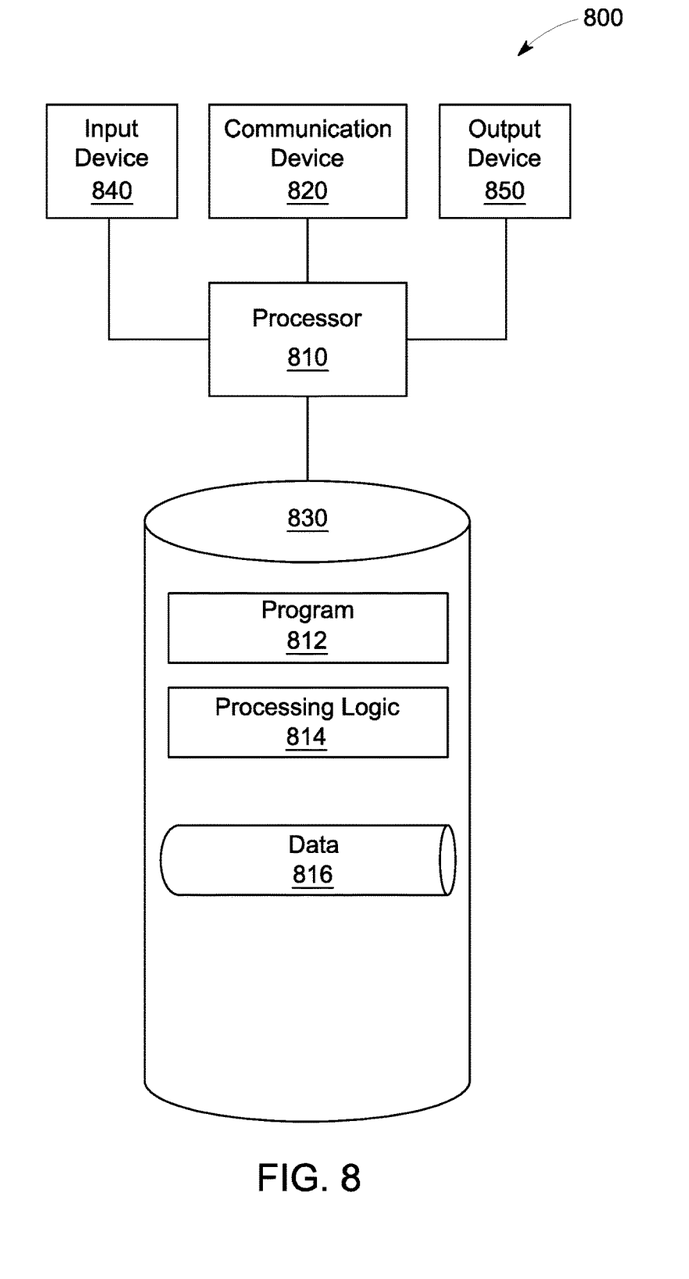
FIG. 8 illustrates a block diagram of a system according to some embodiments.

Note the embodiments described herein may be implemented using any number of different hardware configurations. For example, FIG. 8 illustrates a lineage processing platform 800 that may be, for example, associated with the system 100 of FIG. 1. The lineage processing platform 800 comprises a lineage processor 810 ("processor"), such as one or more commercially available Central Processing Units (CPUs) in the form of one-chip microprocessors, coupled to a communication device 820 configured to communicate via a communication network (not shown in FIG. 8). The communication device 820 may be used to communicate, for example, with one or more users. The lineage processing platform 800 further includes an input device 840 (e.g., a mouse and/or keyboard to enter information about the node of interest) and an output device 850 (e.g., to output and display the lineage).

The processor 810 also communicates with a memory/storage device 830. The storage device 830 may comprise any appropriate information storage device, including combinations of magnetic storage devices (e.g., a hard disk drive), optical storage devices, mobile telephones, and/or semiconductor memory devices. The storage device 830 may store a program 812 and/or lineage processing logic 814 for controlling the processor 610. The processor 810 performs instructions of the programs 812, 814, and thereby operates in accordance with any of the embodiments described herein. For example, the processor 810 may receive nominal CAD image data and then may apply the lineage module 108 via the instructions of the programs 812, 814 to generate a lineage tracing.

The programs 812, 814 may be stored in a compressed, uncompiled and/or encrypted format. The programs 812, 814 may furthermore include other program elements, such as an operating system, a database management system, and/or device drivers used by the processor 810 to interface with peripheral devices.

As used herein, information may be "received" by or "transmitted" to, for example: (i) the platform 800 from another device; or (ii) a software application or module within the platform 800 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a lineage module. The method steps can then be carried out using the distinct software modules and/or sub-modules of the system, as described above, executing on one or more hardware processors 810 (FIG. 8). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method for representing nodes and data flows in a network comprising:
    providing a hierarchical taxonomy for one or more concepts;
    providing one or more hierarchical taxonomies for one or more boundary types, wherein one or more values from each boundary type are combined to form a definition of a boundary;
    associating the at least one concept and at least one boundary with a transmission of data between a first node and a second node, wherein the transmitted data is a data flow; and
    tracing a lineage of the node with a lineage module, wherein tracing the lineage further comprises:
        selecting a target node;
        identifying one or more direct feeder nodes that one of:
            send one or more data elements to the target node or
            receive one or more data elements from the target node;
        adding a path associated with each identified direct feeder node and the target node to a stack;
        adding the target node to a trace result graph;
        determining if the stack is empty;
        retrieving a first path from the stack if the stack is not empty;
        determining if the retrieved path includes one or more loops;
        converting one or more concepts and boundaries to a lowest level concepts and boundaries based on the determination there are no loops in the retrieved path and storing the lowest level concepts and boundaries;
        determining if an intersection exists based on a comparison of the lowest level concepts and boundaries to a lowest level concepts and boundaries for a remainder of the retrieved path; and
        adding a new node to the trace result graph if the intersection exists.

2. The method of claim 1, further comprising:
displaying the network on a user interface, the display including the concepts and boundaries associated with the data flow.

3. The method of claim 2, further comprising:
selecting one or more values from the hierarchical taxonomies to filter the network; and
generating a filtered network display.

4. The method of claim 1, wherein the node is one of a data system, a model/analytic, a process, and a report.

5. The method of claim 1, wherein the boundary types include a business boundary and a product boundary.

6. The method of claim 1, wherein a depth of the hierarchy is unfixed.

7. The method of claim 1, further comprising:
adding one or more direct feeder nodes of the new nodes to the stack.

8. The method of claim 1, further comprising:
identifying one or more concepts and boundaries of the retrieved path prior to converting the one or more concepts and boundaries to the lowest level concepts and boundaries.

9. The method of claim 1, further comprising:
retrieving a next path from the stack after determining the retrieved path includes one or more loops, and determining the stack is not empty.

10. The method of claim 1, further comprising:
retrieving a next path from the stack after determining no intersection exists and determining the stack is not empty.

11. The method of claim 1, further comprising:
generating a result set based on the determination the stack is empty.

12. The method of claim 1, wherein the node represents the concept as a logical grouping of multiple data elements.

13. The method of claim 1, wherein each tracing step is recursive, with each tracing step being dependent on the results from the previous tracing step.

14. The method of claim 1, further comprising:
selecting a target node;
identifying one or more direct feeder nodes from which the target node receives one or more data elements;
identifying one or more nodes to which the target node directly sends one or more data elements.

15. The method of claim 14, wherein validating the target node further comprises:
retrieving each grouping received by the target node from the one or more direct feeder nodes;
retrieving each grouping created by the target node;
retrieving each grouping sent by the target node directly to the one or more nodes;
determining the union of the grouping received by the target node and the grouping created by the target node; and
subtracting that union from the grouping sent by the target node; and determining the target node passes validation if the difference is zero.

16. A system representing nodes and data flows in a network comprising:
a plurality of nodes;
a lineage module; and
a memory in communication with the plurality of nodes and storing program instructions, the lineage module operative with the program instructions and the plurality of nodes to perform the functions as follows:
providing a hierarchical taxonomy for one or more concepts;
providing one or more hierarchical taxonomies for one or more boundary types, wherein one or more values from each boundary type are combined to form a definition of a boundary;
associating the at least one concept and at least one boundary with a transmission of data between a first node and a second node, wherein the transmitted data is a data flow; and
tracing a lineage of a node comprising:
selecting a target node;
identifying one or more direct feeder nodes that one of: send one or more data elements to the target node or receive one or more data elements from the target node;
adding a path associated with each identified direct feeder node and the target node to a stack;
adding the target node to a trace result graph;
determining if the stack is empty;
retrieving a path from the stack if the stack is not empty;
determining if the retrieved path includes one or more loops;
converting one or more concepts and boundaries to a lowest level concepts and boundaries based on the determination there are no loops in the retrieved path and storing the lowest level concepts and boundaries;
determining if an intersection exists based on a comparison of the lowest level concepts and boundaries to a lowest level concepts and boundaries for a remainder of the retrieved path; and
adding a new node to the trace result graph if the intersection exists.

17. The system of claim 16, further comprising:
a user interface including a display operative to display the network, wherein the display includes the concepts and boundaries associated with the data flow.

18. The system of claim 16, wherein the display further comprises:
one or more selectable values of the hierarchical taxonomies on which to filter the network.

19. The system of claim 16, wherein the node is one of a data system, a model/analytic, a process, and a report.

20. The system of claim 16, wherein the boundary types include a business boundary and a product boundary.

21. The system of claim 16, wherein a depth of the hierarchy is unfixed.

22. The system of claim 16, wherein tracing the lineage further comprises:
adding one or more direct feeder nodes of the new nodes to the stack.

23. The system of claim 16, wherein tracing the lineage further comprises:
identifying one or more concepts and boundaries of the retrieved path prior to converting the one or more concepts and boundaries to the lowest level concepts and boundaries.

24. The system of claim 16, further comprising:
a result set generated after the determination the stack is empty.

25. The system of claim 16, wherein each tracing step is recursive, with each tracing step being dependent on the results from the previous tracing step.

26. A non-transitory, computer-readable medium storing instructions that, when executed by a computer processor, causes the computer processor to perform a method for representing nodes and data flows in a network, the method comprising:

providing a hierarchical taxonomy for one or more concepts;

providing one or more hierarchical taxonomies for one or more boundary types, wherein one or more values from each boundary type are combined to form a definition of a boundary;

associating the at least one concept and at least one boundary with a transmission of data between a first node and a second node, wherein the transmitted data is a data flow; and tracing a lineage of a node, the trace comprising:
 selecting a target node;
 identifying one or more direct feeder nodes that one of:
  send one or more data elements to the target node or receive one or more data elements from the target node;
 adding a path associated with each identified direct feeder node and the target node to a stack;
 adding the target node to a trace result graph;
 determining if the stack is empty;
 retrieving a first path from the stack if the stack is not empty;
 determining if the retrieved path includes one or more loops;
 converting one or more concepts and boundaries to a lowest level concepts and boundaries based on the determination there are no loops in the retrieved path;
 determining if an intersection exists based on a comparison of the lowest level concepts and boundaries to a lowest level concepts and boundaries for a remainder of the retrieved path; and
 adding a new node to the trace result graph if the intersection exists.

27. The medium of claim 26, wherein the method further comprises:

ceasing the trace when the stack is empty.

* * * * *